United States Patent [19]
Wickham

[11] Patent Number: 4,787,128
[45] Date of Patent: Nov. 29, 1988

[54] MODULARLY EXPANDABLE INTEGRATED PROCESS MACHINE SYSTEM AND ROTARY INDEXING MECHANISM THEREFOR

[75] Inventor: John L. Wickham, Glenarm, Md.

[73] Assignee: J. L. Wickham Co., Baltimore, Md.

[21] Appl. No.: 50,394

[22] Filed: May 18, 1987

Related U.S. Application Data

[63] Continuation of Ser. No. 881,236, Jul. 2, 1986, abandoned.

[51] Int. Cl.$^4$ .................. B23P 23/04; B23Q 16/06
[52] U.S. Cl. .................. 29/33 P; 29/563; 74/813 L; 74/813 R; 198/859
[58] Field of Search .............. 74/813 R, 813 L, 815, 74/816, 817, 819, 820, 822, 10.2, 10.39, 10.8, 813 C; 29/563, 33 P, 564; 198/348, 858, 859, 341, 351, 352; 364/478; 318/567, 626

[56] References Cited

U.S. PATENT DOCUMENTS

| | | | |
|---|---|---|---|
| 2,192,251 | 3/1940 | Whittaker | 74/817 X |
| 2,848,909 | 8/1958 | Hill | 74/817 |
| 3,733,929 | 5/1973 | Fatula | 74/813 L X |
| 3,860,108 | 1/1975 | Farfaglia | 198/859 X |
| 4,035,904 | 7/1977 | Ishizaka et al. | 29/563 |
| 4,054,202 | 10/1977 | Hautemont | 198/859 X |
| 4,292,892 | 10/1981 | Combs | 198/859 X |
| 4,412,609 | 11/1983 | Schieve | 198/341 |
| 4,552,260 | 11/1985 | Teagno et al. | 29/33 P X |

FOREIGN PATENT DOCUMENTS

| | | | |
|---|---|---|---|
| 110652 | 4/1964 | Czechoslovakia | 29/33 P |
| 1174362 | 3/1959 | France | 29/33 P |

*Primary Examiner*—Bentsu Ro
*Attorney, Agent, or Firm*—Cushman, Darby & Cushman

[57] ABSTRACT

A modularly expandable integrated process machine system incorporating a rotary indexing mechanism therefor. The machine system is made up of a support platform with predefined work station positions which each have the same dimension tool mounting configuration. Pallets are advanced between workstations by an endless chain incremented by a precision rotary indexing mechanism capable of precise end-of-movement positioning and variable force advancing.

9 Claims, 13 Drawing Sheets

FIG. 1

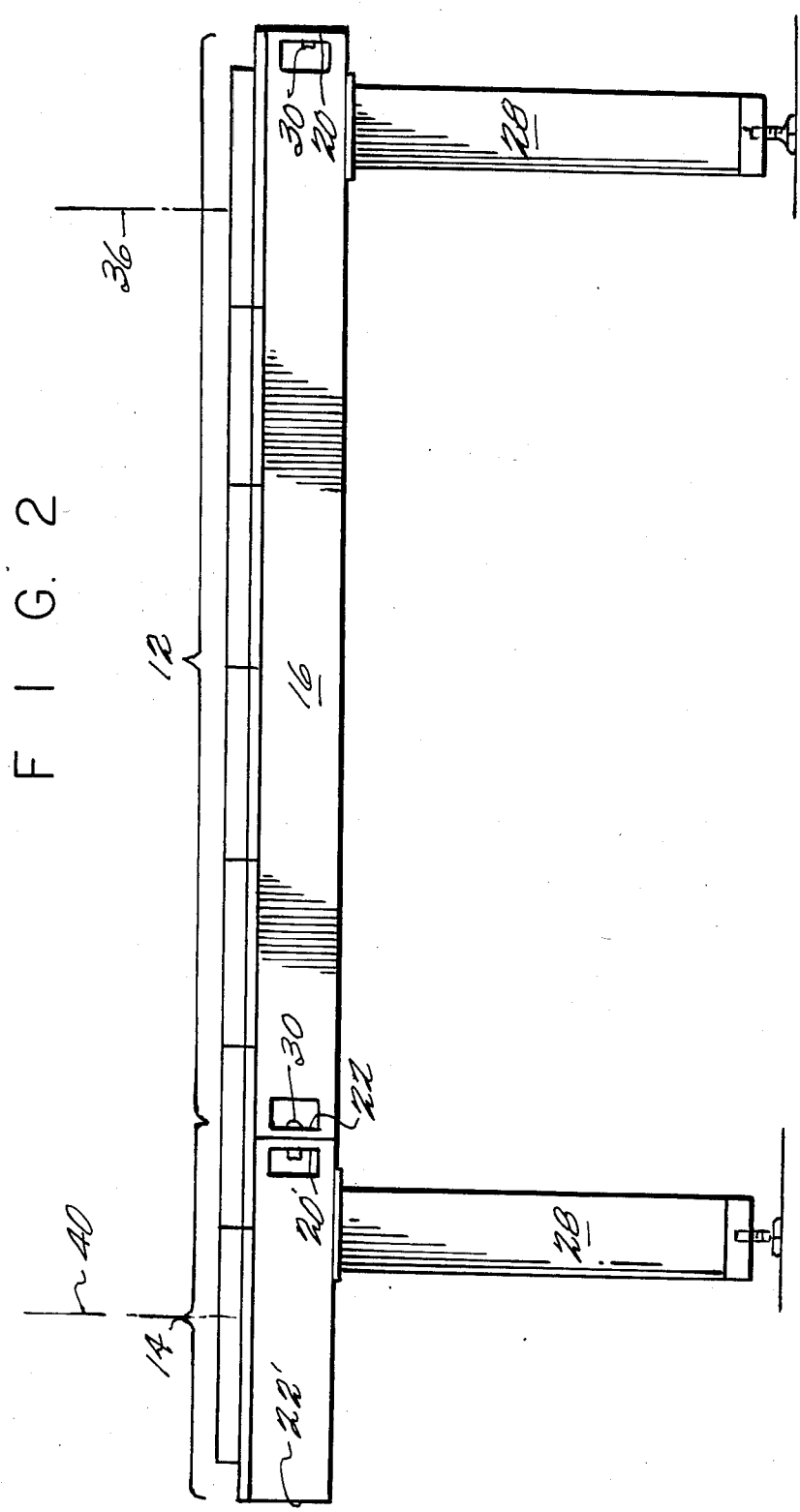

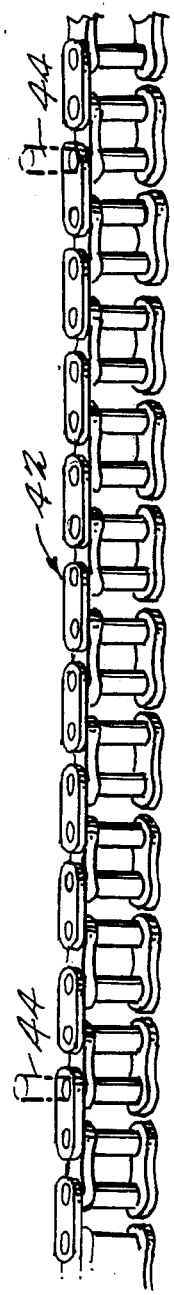
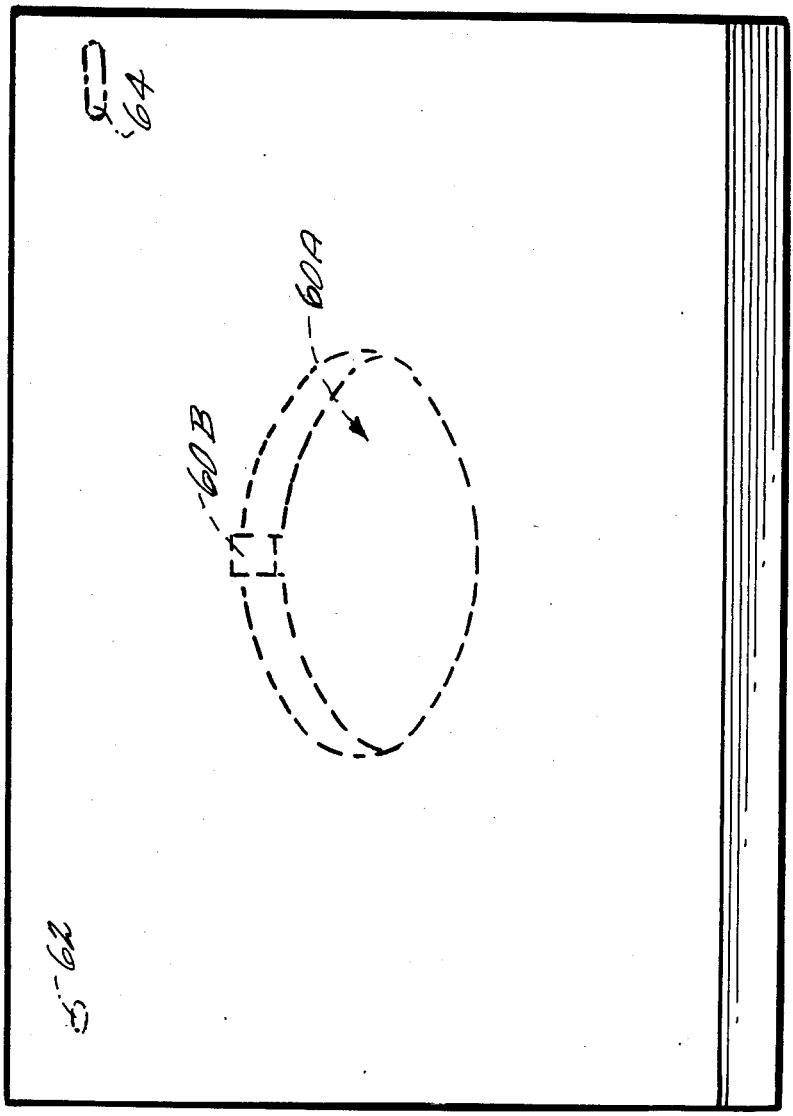
FIG. 5

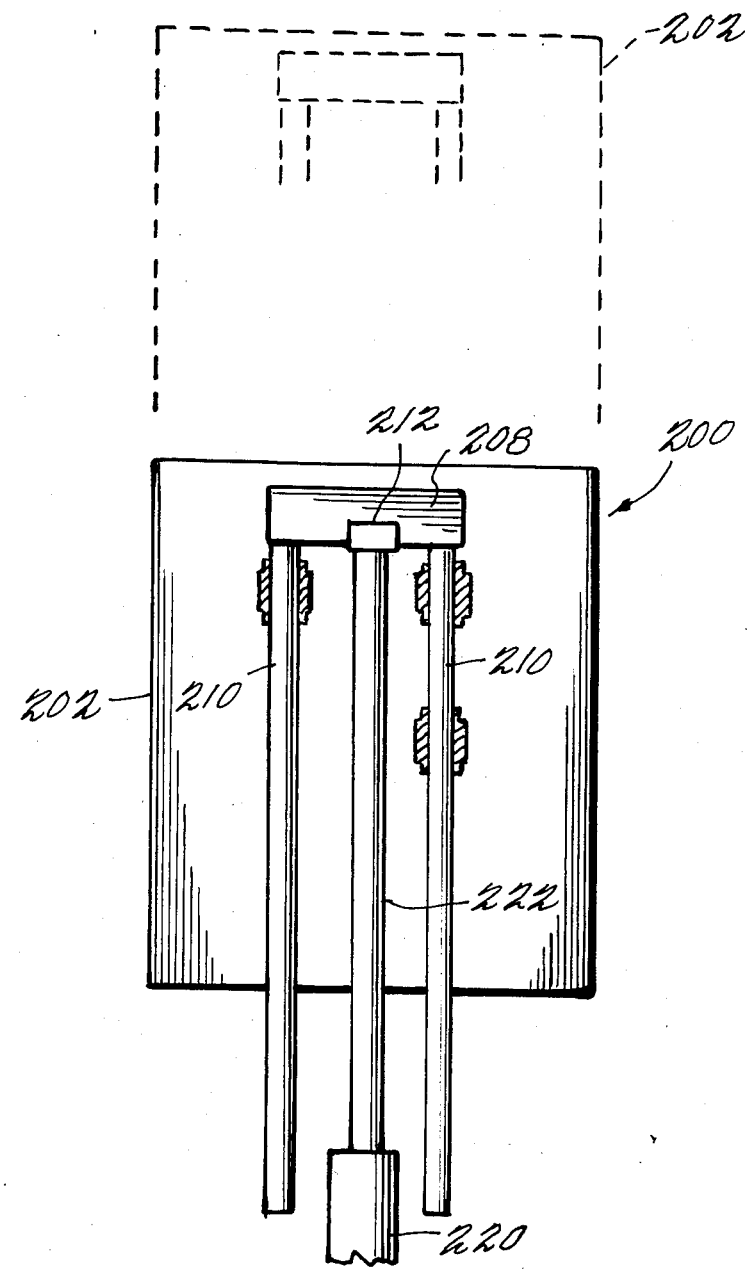

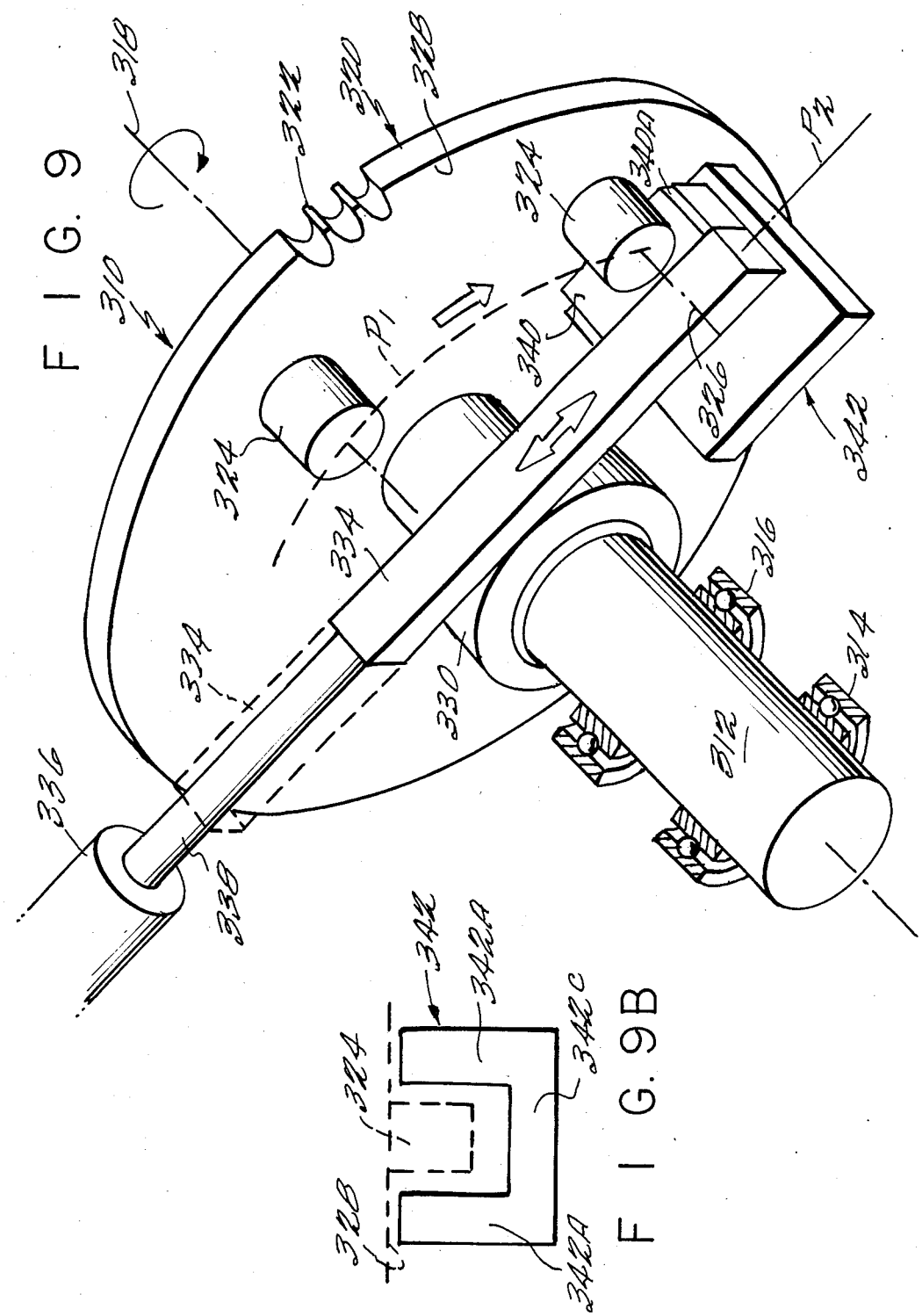

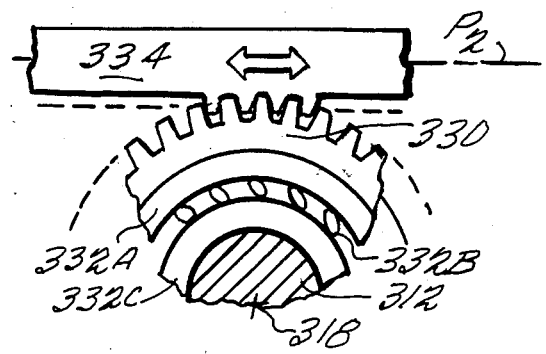
F I G. 9A
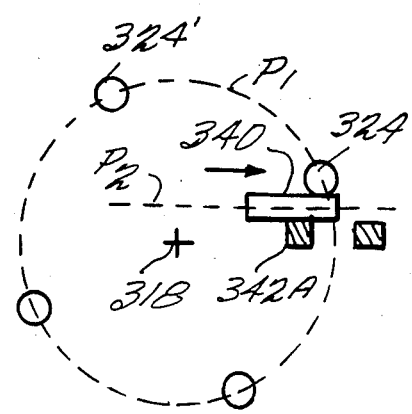
F I G. 10A
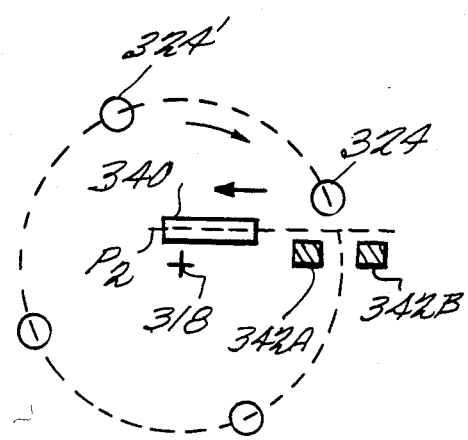
F I G. 10B
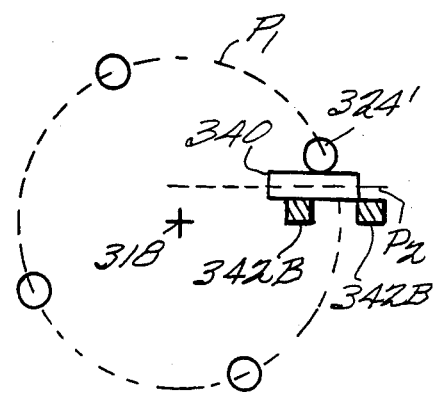
F I G. 10C

MODULARLY EXPANDABLE INTEGRATED PROCESS MACHINE SYSTEM AND ROTARY INDEXING MECHANISM THEREFOR

BACKGROUND OF THE INVENTION

This application is a continuation of application Ser. No. 06/881,236 for a Modularly Expandable Integrated Process Machine System, filed July 2, 1986, and incorporates the disclosure of application Ser. No. 06/879,623, for a Rotary Indexing Mechanism, filed June 27, 1986, both are now abandoned.

The present invention relates to systems for the machining of work pieces, other process operations, and the assembly thereof and, more particularly, to machine systems for performing manufacturing processes including the manufacture of machined parts and the assembly thereof in which a high degree of flexibility and adaptability is maintained while minimizing the time and costs associated with tooling changeover and set-up.

Systems for the manufacture of machined parts and the assembly of those parts have historically been developed as a function of the volume of parts to be produced. Where a large quantity of parts are to be manufactured and or assembled in a continuous or near continuous manner, specialized machinery has been developed for the particular application. In general, the development and capital equipment costs for such specialized machine systems is very high although the initial costs can be amortized over long production runs to result in lower overall piece-part and assembly costs when compared to other types of systems. While systems of this type are well-suited for large volume runs, their specialized design is such that they have a low adaptability for the manufacture of parts and assemblies outside of their design specifications. Where machined parts and assemblies are required in moderate volumes, as contrasted to high volumes, the design costs associated with dedicated or specially designed machine systems are prohibitive.

Various types of so-called flexible machining systems have been developed to meet the requirements for the moderate volume manufacture of machined parts. In these systems, one or two controllable tool-accepting spindles are made available for receiving various types of edged cutting bits or component grasping and manipulating devices. The spindles are controlled by a stored-program sequencer or computer that is programed to cause the tools to advance toward and retract from a workpiece as well as manipulate the workpiece. In the more sophisticated of these machines, the tools carried by the spindle or spindles are removed and replaced by automatic tool changers. While general purpose flexible machining systems can be adapted to manufacture different types of parts and do not require the substantial capital investment of specially designed systems, such machines are often quite slow in comparison, and it is often times difficult to produce a finished machine part or fabricate a sub-assembly of moderate complexity on a single stand-alone machine thus requiring additional machines and the transfer of semi-finished parts or sub-assemblies from one machine to the other. The need to transfer parts and sub-assemblies from one machine station to another oftentimes results in undue labor costs associated with the transfer task, and the need for additional machine stations increases the floor space and associated costs required to perform the intended task making flexible machine systems uneconomic in moderate Volume situations.

Further, a less complicated and more precise indexing mechanism for the above machining systems has been needed.

Various types of mechanical, electromechanical, and electronic rotary indexing mechanisms are known for providing incremental rotation of a shaft through a selected angular increment. Mechanical devices include pawl and ratchet assemblies in which a first pawl rotates a ratchet and a second pawl-maintains the rotated ratchet at its end-of-movement position and detent mechanisms in which a resiliently biased detent member engages the rotated member at selected detent positions. Electrical actuators, typically in the form of solenoids and other electro-magnetic devices, have been adapted to drive mechanical mechanisms to provide increased control. Lastly, electronic rotary indexing devices have used drive motors, usually of the stepper motor type, and shaft position sensors to provide a wide range of control including control of the size of the rotary increment and the precise end-of-movement location of the rotated member.

While prior rotary indexing mechanisms and devices have been satisfactory, many of the mechanical and electro-mechanical mechanisms do not provide for the precise end-of-movement positioning of the rotated member or an ability to adjust the end-of-movement position. Additionally, some prior devices apply a non-uniform force to the rotated member and cause undesirable variations in the motion of the rotated member as it is incremented. Electronically controlled indexing motors and their related control circuitry do provide precise incrementing and end-of-movement position control but are oftentimes too expensive for many applications.

SUMMARY OF THE INVENTION

In view of the above, it is an object of the present invention, among others, to provide a machine system and associated rotary indexing mechanism that offers a flexible and expandable environment for the machining of work pieces, other process operations, and the assembly thereof having an operating and indexing cycle that is substantially more efficient and less complicated than that associated with prior flexible machine systems.

It is another object of the present invention to provide an integrated process machine system that provides a high degree of flexibility so that the system can be quickly and efficiently changed over for the manufacture of different types of parts and sub-assemblies.

It is another object of the present invention to provide an integrated process machine system that provides a high degree of flexibility and which can be inexpensively retooled for new work pieces.

It is another object of the present invention to provide an integrated process machine system in which tooling costs, changeover, and setup time is minimal compared to prior systems to thus minimize down time and costs associated with new tooling and tooling changeover.

It is another object of the present invention to provide a modular integrated process machine system that has multiple work station positions and a system of interchangeable tooling modules which can be mounted to and removed from any work station position with minimal expenditure of time.

It is another object of the present invention to provide an integrated process machine system that can be rapidly expanded in a modular fashion to accommodate different applications.

It is another object of the present invention to provide a rotary indexing mechanism for use with an associated machining system for rotating a shaft or shaft mounted member through a precise angular increment in which the size of the increment is precisely determined.

It is another object of the present invention to provide a rotary indexing mechanism for use with an associated machining system for rotating a shaft or shaft mounted member through an angular increment in which the end-of-movement position of the rotated member is precisely determined for each angular increment.

It is a further object of the present invention to provide a rotary indexing mechanism for use within an associated machining system in which the rotated member is driven by a uniformly applied force no greater than that needed to effect operation of the mechanism.

In the preferred embodiment of the rotary indexing mechanism associated with the modular machining system, a shaft mounted for rotation about a longitudinal axis carries an enlarged diameter member such as a sprocket or gear. At least one stop post is secured to one face of the enlarged diameter member and progresses along an orbital path about the longitudinal axis of the shaft as the shaft is rotated. A pinion gear is connected to the shaft through a one-way clutch and is rotated in one direction or the other by a bidirectionally reciprocated rack. Rotation of the pinion gear in one direction is coupled through the one-way clutch to rotate the shaft and move the stop post along its orbital path. The rack carries a blocking plate that intersects or crosses the orbital path during the end portion of the rack's movement so that the blocking plate and the stop post engage one another to halt further rotary movement. The end-of-movement position of the rotary shaft can be precisely adjusted, for example, by eccentrically mounting the stop post on the enlarged diameter member, using posts of different diameters, or by mounting the post at varying radii to vary the intercept conditions between the stop post and the blocking plate.

The present invention also provides a rotary indexing mechanism which includes a rotatably mounted shaft that carries at least one first stop member for movement along an orbital path about the rotated shaft. A drive mechanism includes a linear-to-rotary converting mechanism, such as an actuator driven rack and pinion assembly, with the rack reciprocated along a path that intersects the orbital path of the first stop member. An overrunning or similar one-way clutch couples the pinion to the shaft so that motion of the rack in a first direction is coupled through the pinion and the one-way clutch to rotate the shaft while motion of the rack in the opposite direction is uncoupled from the shaft. The rack carries a second stop member that is positioned in the path of the first stop member to allow both stop members to engage one another and forcibly halt the rotation of the shaft at a precise end-of-movement position. One or both of the stop members is adjustably mounted to allow the user to precisely control the point of engagement between the two stop members to thus control the end-of-movement position of the shaft.

In the preferred embodiment of the expandable machining system, a support platform is provided with predefined work station positions each of which has the same dimension mounting configuration. Work pieces are carried on pallets constrained to move on rails along a path to each work station position. The pallets are preferably coupled to a carrier that is translated about a closed circuit in increments equal to the spacing between the work station positions so that each incremental movement of the carrier moves a pallet and its work piece from one work station position to the next.

The integrated process machine system of the present invention provides substantial benefits in terms of the relative cost savings associated with tooling for new work pieces and in terms of the relatively time efficient manner that tooling modules can be mounted to various of the available work station positions to perform a desired series of machining, assembling, or other functions.

In view of these objects, and others, the present invention provides an integrated process machine system and rotary indexing mechanism which includes a plurality of work station mounting positions having standard dimension mounting characteristics and a pallet transport system that transports a work piece carrying pallet from one work station mounting position to another. Tooling modules having the standard dimension mounting characteristics of the work station positions are mounted at the various work station mounting positions and have tools for machining, assembling, or otherwise operating upon the work pieces carried to each tooling module to effect the desired operational step in accordance with the particular application. By providing work station positions and tooling modules having a standard-dimension interface, tooling modules for a particular application can be quickly mounted to the work station positions to configure the integrated process machine system for a particular application and quickly dismounted and replaced by other tooling modules for a different application.

A principal objective of the present invention is, therefore, the provision of an improved modular integrated process machine system and associated rotary indexing mechanism having a high degree of flexibility and expandability for adapting to a wide variety of applications.

The present invention also advantageously incorporates a rotary indexing mechanism which is relatively simple in construction and inexpensive to fabricate and which allows precise angular incrementing of a rotary member and precise end-of-movement positioning. Other objects and further scope of applicability of the present invention will become apparent from the detailed description to follow, taken in conjunction with the accompanying drawings, in which like parts are designated by like reference characters.

BRIEF DESCRIPTION OF THE DRAWING

FIG. 1 is a plan view of and integrated process machine system in accordance with the present invention;

FIG. 2 is a front elevational view of the integrated process machine system of FIG. 1;

FIG. 5 is an isometric view of a carrier chain and a work piece pallet;

FIG. 8A is a rear view of the wash station tooling module of FIG. 8 with selected parts omitted for reasons of clarity.

FIG. 9 is a perspective view of a rotary indexing mechanism in accordance with the present invention with selected parts omitted or shown in schematic form for reason of clarity;

FIG. 9A is an end view, in partial cross section, of a rack and pinion gear set and a one-way clutch of FIG. 9;

FIG. 9B is an elevational view of a support yoke illustrated in FIG. 9;

FIG. 10A is a schematic view of various components illustrated in FIG. 9 in a first position;

FIG. 10B is a schematic view, similar to FIG. 10A, illustrating the components in second position;

FIG. 10C is a schematic view, similar to FIGS. 10B and 10B, illustrating the components in a third position;

DESCRIPTION OF THE PREFERRED EMBODIMENT

Figure 1:
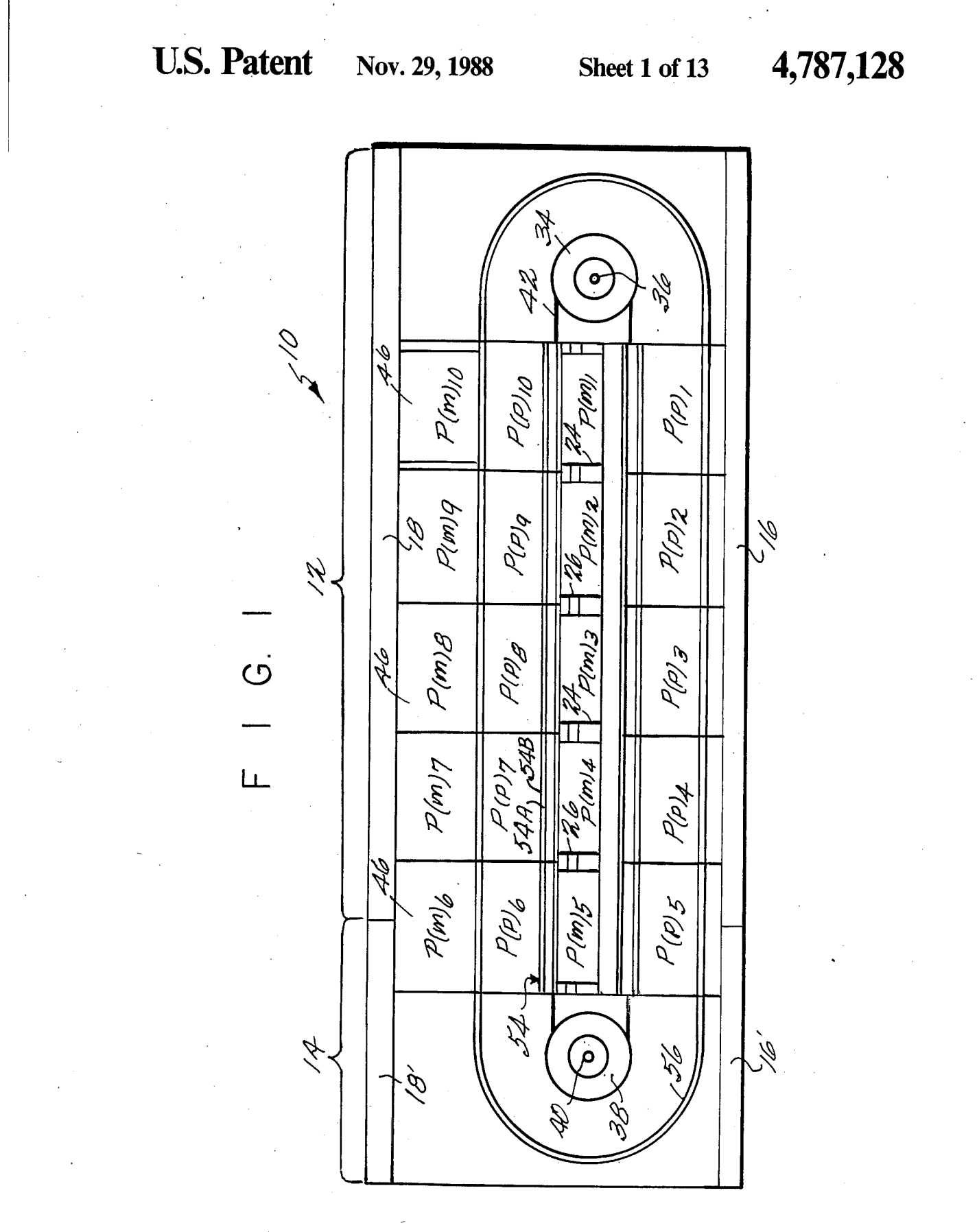
Figure 1A:
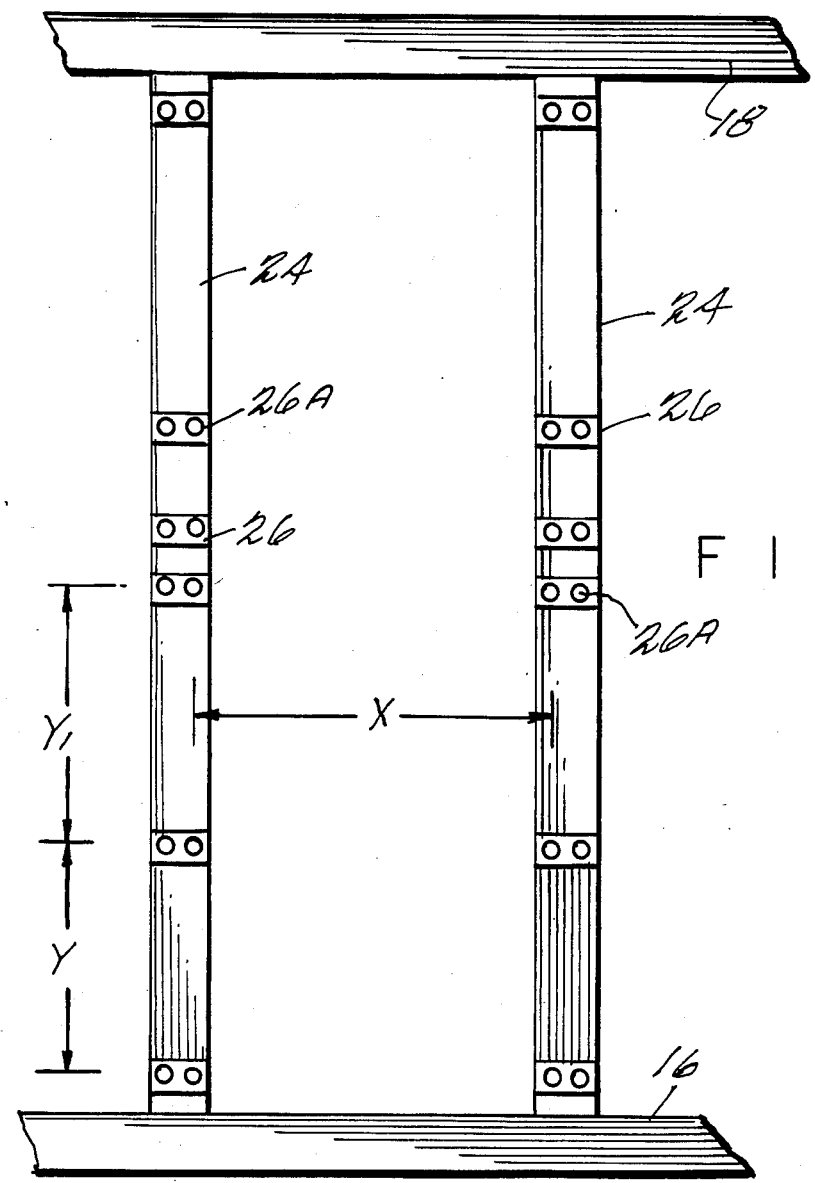
FIG. 1A is a detail view of two adjacent lateral supports used in the integrated process machine system of FIG. 1 illustrating the standard dimension mounting arrangment.
Figure 3:
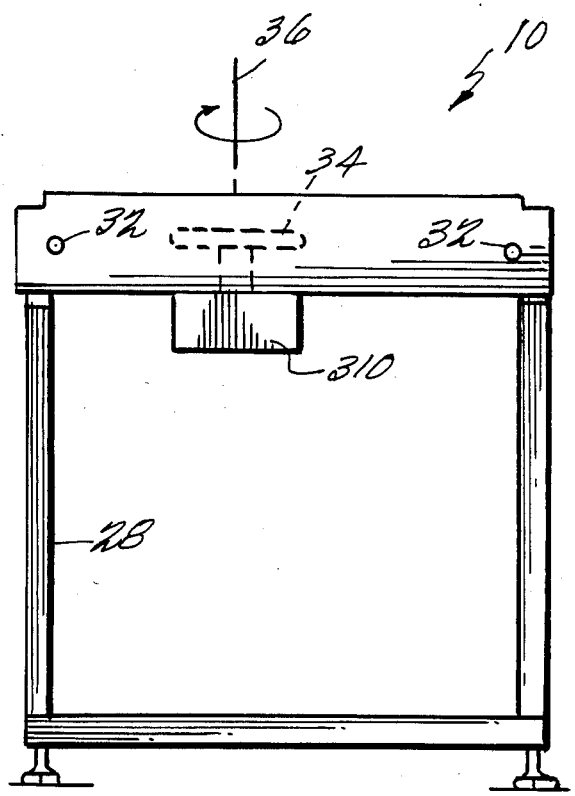
FIG. 3 is an end view of the integrated process machine system of FIGS. 1 and 2 taken along line 2—2 of FIG. 1.

A modular integrated process machine system in accordance with the present invention is shown in FIGS. 1, 2, and 3 and designated generally therein by the reference character 10. As shown, the integrated process machine system 10 includes a principal unit 12 coupled to an end unit 14. The principal unit 12 is fabricated from side rails 16 and 18 connected at their opposite ends by end plates 20 and 22 and, at intermediate positions along their length, by lateral supports 24 that include mounting pads 26, as shown in FIG. 1 and in the detail of FIG. 1A. The mounting pads 26 each include threaded bores 26A that with threaded bores 26A on the mounting pads 26 of two adjacent lateral supports spaced by a system standard distance 'X' and with threaded bores 26A of two adjacent mounting pads 26 of the same lateral support 24 spaced by various system standard distances 'Y', 'Y$_1$', etc. The X-Y spacing of the various threaded bores 26A defines a standard dimension X-Y interface system for mounting tooling modules, as explained more fully below. The end unit 14 is similar in construction to the principal unit 12 and includes side rails 16' and 18' connected by end plates 20' and 22'. The side rails 16, 16', 18, and 18' are each provided with cut-out portions (unnumbered) adjacent the respective end plates 20, 20', and 22 to facilitate connection of the abutting end plates with threaded fasteners 30 extending through clearance bores 32 (FIG. 3) provided in the various end plates. A support leg 28 is located adjacent the rightward end of the principal unit 12 with another support leg 28 provided for the end unit 14. The principal unit 12 and the end unit 14 are thus joinable to form a unitary structure that presents a generally horizontal platform with standard X-Y dimension mounting positions. As can be appreciated and in accordance with the present invention, additional principal units 12 can with connected end plate to end plate to provide a modularly extendable structure with the end unit 14 connected to the last principal unit 12 in the series of principal units 12.

As best seen in the plan view of FIG. 1, the right end portion of the principal unit 12 is provided with a rotatably mounted sprocket 34 mounted for rotation about the axis 36. In a similar manner, another sprocket 38 is rotatably mounted on the end unit 14 for rotation about the axis 40. A link-type chain 42 is entrained about the sprockets 34 and 38 and is carried, in that portion between the sprockets 34 and 38, in a series of modular chain guides, as described more fully below in relationship to FIG. 6. The chain 42, a portion of which is illustrated in FIG. 5, is of conventional design and includes vertically extended link pins 44 spaced at equal intervals along the chain 42.

The upper, horizontal portion of the principal unit 12 is divided into same-dimension work station positions P0, P1, ... P$_n$ with ten work station positions being shown in the illustrated embodiment of FIG. 1. Each work station position P$_n$ extends between the lateral supports 24 and has a preselected width, thirteen inches in the case of the illustrated embodiment, and includes a tooling module position P(m)$_n$ and a pallet position P(p)$_n$. The tooling module positions P(m)$_n$ are each designed to accept tool carrying modules (discussed below in relationship to FIGS. 7, 7A, 8, and 8A) with the modules having a commonly dimensioned mounting plate dimensioned in a manner consistent with the X-Y dimensioning of the mounting pads 26 and threaded bores 26A of the lateral supports 24 to allow mounting at any one of the available tooling module positions P(m)$_n$. Each of the tooling modules, in turn, performs its operation, be it a machining, assembling, or other operation, on a work piece or sub-assembly carried to the associated pallet position P(p)$_n$ on a pallet transported by the chain 42 as described below. As shown in FIG. 1, the tooling module positions P(m)$_6$ through P(m)$_9$ have been provided with cover plates 46 while the tooling module positions between the opposed flights of the chain 42 (that is, tooling module positions P(m)$_1$ through P(m)$_5$ and tooling module position P(m)$_{10}$ have been shown without cover plates 46 to reveal the underlying lateral supports 24 to which the cover plates 46 are secured by appropriate threaded fasteners (not specifically shown). The cover plates 46 are used when a tooling module is not mounted at a particular tooling module position P(m)$_n$.

Figure 6:
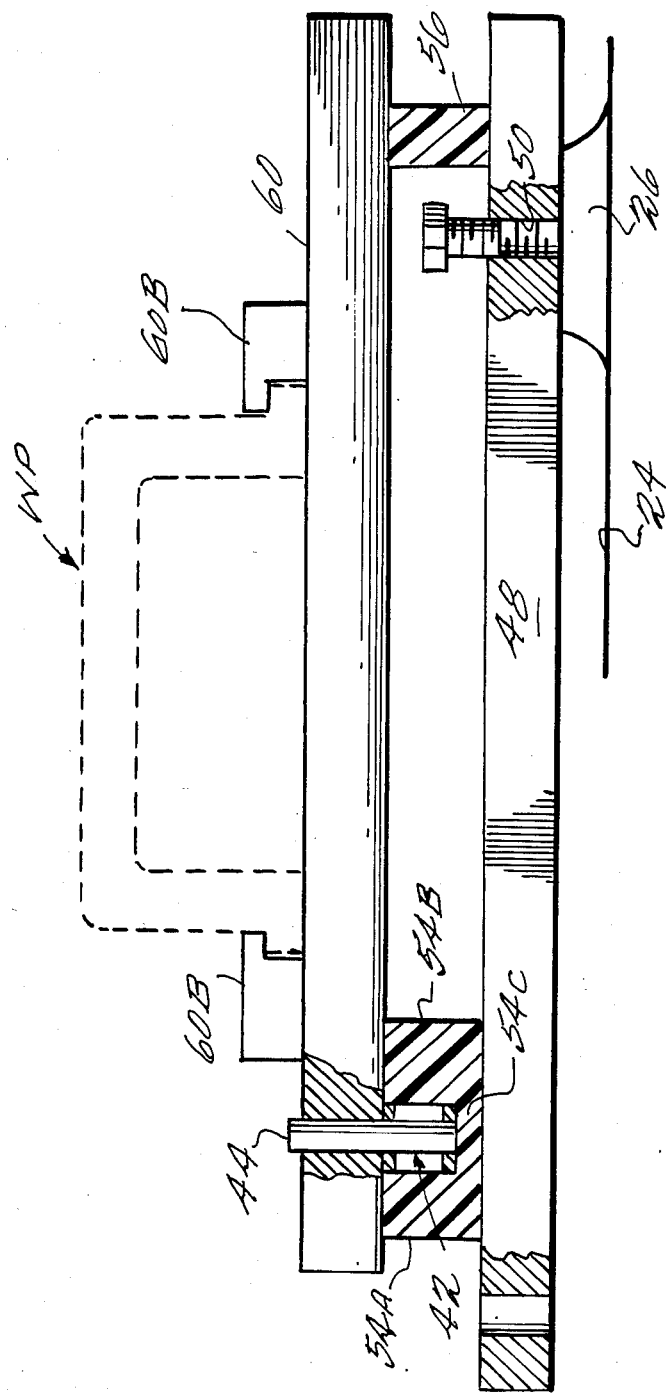
FIG. 6 is a side view, in partial cross-section, of a work piece pallet mounted upon inner and outer support rails of a sub-plate with an exemplary piece-part shown in generalized outline.

A sub-plate 48 is mounted at each pallet position P(p)$_n$ and, as shown in FIG. 6, is defined as a generally horizontally aligned plate having appropriate clearance bores 50 dimensioned in a manner consistent the X-Y dimensioning scheme and through which appropriate threaded fasteners 52 extend to engage the underlying mounting pads 26. Each of the sub-plates 48 is provided with inner and outer pallet rails 54 and 56. The inner pallet rail 54, which also serves as a guide for the chain 42, includes first and second opposed legs 54A and 54B connected by a bridge 54C to define a U-shaped opening in which the chain 42 is carried between the sprockets 34 and 38. The outer pallet rail 56 is spaced outwardly of the inner pallet rail 54 and extends upwardly from the sub-plate 48 with the upper ends of the pallet rails 54 and 56 lying in the same horizontal plane. The outer pallet rail 56 follows a curvilinear path at the right end of the principal unit 12 and on the end unit 14 so that the outer pallet rail 56 forms a continuous path about the principal unit 12 and the end unit 14. On the other hand, the inner pallet rail 54 extends only along the linear portions of the chain 42 path between the sprockets 34 and 38. The inner and outer pallet rails 54 and 56 are preferably fabricated from a wear resistant plastic having a low coefficient of friction or self-lubricating properties, such plastics including, for example, polytetrafluoroethylene and related resins as well as certain polycarbonates. The dimensioning of the inner and outer rails 54 and 56 should be such that the bearing load can be supported without flexure or undue wear at the upper surfaces thereof.

Figure 4:
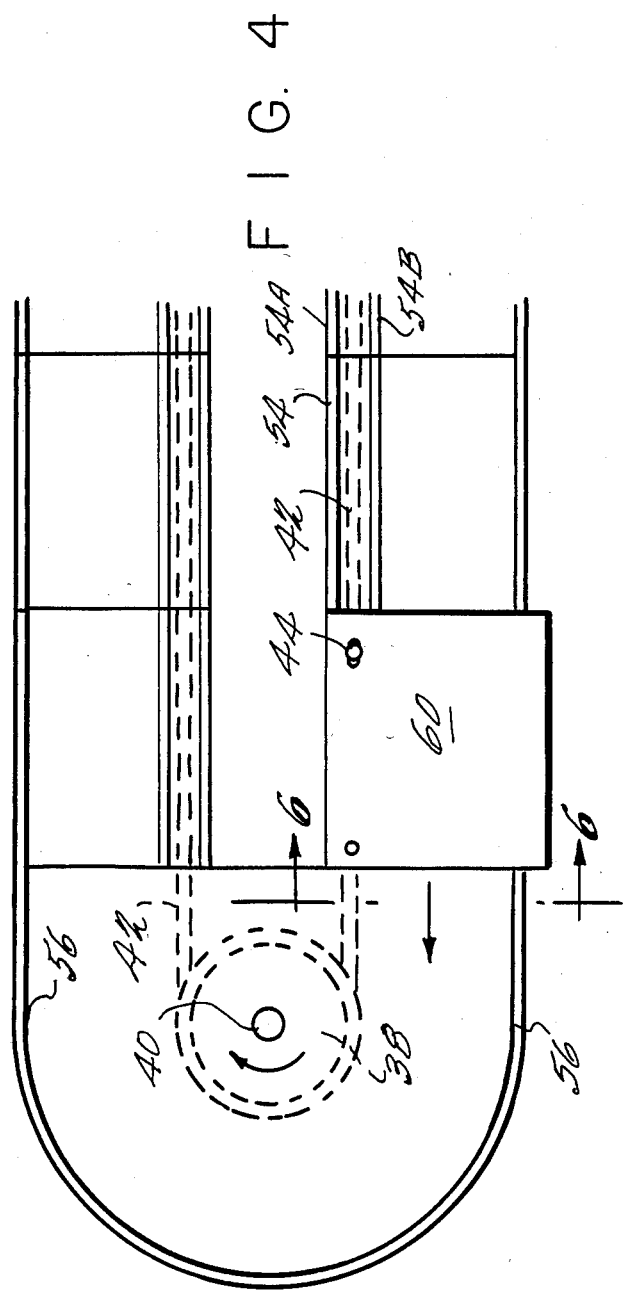
FIG. 4 is an enlarged view of a portion of the integrated process machine system showing a work piece pallet.

As shown in FIGS. 4, 5, and 6, the chain 42 is designed to engage and transport a pallet, designated generally in the figures by the reference character 60, along a path that corresponds generally to that defined by and between the outer pallet rail 56 and the chain 42. The pallets 60 can have different configurations depending upon the particular application, although a generally rectangular pallet 60 is preferred. As shown in FIG. 5, each pallet 60 includes a bore circular 62 for engagement by a link pin 44 and an elongated slot 64 for engagement by the next adjacent link pin 44 of the chain 42. When engaged by the chain 42, the inner end of each pallet 60 rides atop the inner pallet rail 54 and the outer end of the pallet 60 rides atop the outer pallet rail 56. The pin 44 that engages the bore 62 provides the primary force transmitting connection to the chain 42 with the pin 44 that engages the slot 64 providing a lost motion connection that allows the pallet 60 to be transported around the curvilinear portions of its path about the sprockets 34 and 38. Each pallet 60 is designed to carry a work piece or a sub-assembly upon which an operation is to be performed at the various pallet positions $P(p)_n$. The pallet 60 is either configured to carry the work piece or subassembly or carry a jig, fixture, or cradle (not specifically shown) to which the work piece or subassembly is mounted. By way of illustration, the pallet 60 in FIG. 5 is provided with a circular opening 60A (dotted line illustration) having a keyway 60B which is designed to accept a work piece or sub-assembly. Likewise, in FIG. 6 a flanged work piece WP is shown clamped to the pallet 60 by appropriately shaped clamps 60B. As can be appreciated, a large number of work piece and subassembly mounting configurations and arrangements are possible depending upon the particular work piece or sub-assembly to be processed.

The chain 42 is driven in an incremental fashion about its circuit by a rotary indexing mechanism coupled to one of the sprockets 34 or 38 with the other sprocket serving as an idler. In the preferred embodiment, the sprocket 34 is connected through a shaft 312, shown in dotted line illustration in FIG. 3, to a rotary indexer shown in general form and designated by the reference character 310. The rotary indexer 310 is designed to rotate the connected sprocket 34 through a rotary increment which translates the chain 42, and any pallets 60 carried by the chain 42, by an amount equal to the width of each modular work station position $P(m)_n$. Accordingly, each successive rotary increment will successively advance a pallet 60 from one work station position $P(m)n$ to the next $P(m)n+1$. Various known rotary indexing mechanisms can be used to incrementally rotate the sprocket 34.

A preferred embodiment of a rotary indexing mechanism in accordance with the present invention is illustrated in FIG. 9 and designated generally therein by the reference character 310. As shown, a shaft 312 is mounted in bearings 314 and 316 for rotation about a longitudinally extending axis 318. An enlarged diameter member in the form of a chain engaging sprocket 320 having sprocket teeth 322 (of which three are illustrated) formed about its periphery is secured to the shaft 312 for rotation therewith. A plurality of cylindrical stop posts 324, each having respective axes 326, are secured to a face 328 of the sprocket 320 at a selected radius relative to axis 318 with the axes 326 aligned parallel to the shaft 312. Each of the stop posts 324 includes a reduced diameter threaded shaft (not shown in FIG. 9) that extends through a clearance bore in the sprocket 320 and which is secured in place by a threaded fastener. As the shaft 312 and sprocket 320 rotate about the axis 318 in the direction indicated, the stop posts 324 describe an orbital locus or path $P_1$ about the longitudinal axis 318. As explained more fully below, the stop posts 324 can be positioned at equal or unequal angular spacings about the path $P_1$, can be positioned at different radii relative to the longitudinal axis 318, and can be formed with different diameters or with other, non-cylindrical shapes.

The shaft 312 is driven, in the preferred embodiment, by a linear-to-rotary mechanism in the form of a rack and pinion set. As shown in FIGS. 9 and 9A, a pinion 330 is coupled to the shaft 312 through a concentrically mounted one-way clutch 332. The one-way clutch 332 is of the sprag-type in that rotation of the pinion 330 and an outer race 332A in a first direction (clockwise in the case of FIG. 9A) causes the sprags 332B to engage an inner race 332C to thus drive the shaft 312. Conversely, rotation of the outer race 332A in the opposite direction (counterclockwise in FIG. 9A) uncouples the inner race 332C and the shaft 312 from the outer race 332A to prevent counterclockwise rotation of the shaft 312. In addition to the sprag-type clutch illustrated, other types of one-way and overrunning clutches are suitable.

A toothed rack 334 engages the pinion 330 and is mounted for reciprocation along a linearly extending path $P_2$ between an advanced position, indicated generally in solid line illustration in FIG. 9, and a retracted position, as indicated partly in broken line illustration. The rack 334 is connected to and controlled by a bidirectional actuator 336, preferably in the form of a hydraulic or pneumatic cylinder (partially illustrated), having a connecting rod 338 connected to the rack 334. A stop plate 340 is connected to one end of the rack 334 and moves generally along the path $P_2$ between the solid position of FIG. 9 and a retracted position. As shown in solid line illustration, the stop plate 340 intersects the path $P_1$ described by the stop posts 324. If desired, the stop plate 340 can be provided with a beveled surface 340A at its leading edge.

A support yoke 342 (FIG. 9B) is mounted to support the stop plate 340 as it is engaged by the stop post posts 324, as explained below, and includes spaced apart legs 342A and 342B connected by a bridge 342C to define an aperture or window 344 sufficiently large to allow the stop posts to pass through as they move along the path $P_2$.

The operation of the rotary indexing mechanism 310 is illustrated in schematic form in FIGS. 10A, 10B, and 10C. As shown in FIG. 10A, the stop plate 340 is at an advanced position along the path $P_2$ with the stop plate 340 blocking the engaged stop post 324 from movement along the path $P_1$ and thus establishing the end-of-movement position of the shaft 312. In this position, as illustrated in FIG. 9, the stop plate 340 is constrained between the engaged stop post 324 and the support yoke 342. In order to effect a rotary incrementing of the shaft 312, the rack 334, under the control of the actuator 336, is retracted along path $P_2$ to move the stop plate 340 to its retracted position, as represented in FIG. 10B. During retraction of the rack 334 and the stop plate 340, the shaft 312 is uncoupled from the pinion 330 by the one-way clutch 332 as described above. Thereafter, the motion of the actuator 336 is reversed and the rack 334 and the stop plate 340 are moved along the path $P_2$ to their respective advanced positions. As discussed above in relationship to FIG. 9A, the rotation of the pinion 330 is coupled through the one-way clutch 332 to the shaft 312 to cause the shaft 312 and the connected sprocket 320 to rotate in the clockwise direction. The top post 324 that was in engagement with the stop plate 340 proceeds along the path $P_1$, passing through the window 344 defined by the support yoke 342. As the rack 334 and the connected stop plate 340 are advanced to the right, the stop plate 340 intersect and moves into the path $P_1$ of the next successive stop post 324'. At some point in the movement of the stop post 324' and the stop plate 340, the two components engage one another to halt further motion and thus establish the end-of-movement position of tha shaft 312 and the sprocket 320. As can be appreciated, the operational sequence can be repeated in a successive manner to provide continuous rotary incrementing of the shaft 312 and sprocket 320 through predetermined angular increments.

Since the rotary motion of the shaft 312 and sprocket 320 is halted by engagement of the stop posts 324 and the stop plate 340, the end-of-movement position of the shaft 312 is determined by the stop posts 324 and the stop plate 340 and is independent of any clearances or changes in clearances between the engaged rack 334 and pinion 330 or any 'play' in the one-way clutch 332 as it changes from its uncoupled condition to its coupled condition as the rack 334 is advanced along its path $P_2$. Thus the actuator 336 will continue to drive the rack 334 until the stop post 324 engages the stop plate 340 to halt further motion and will continue to accurately position the shaft 312 and sprocket 320 regardless of wear present in the one-way clutch 332 or the rack 334 and pinion 330 set.

The magnitude of the rotary increment is controlled by controlling the angular spacing of the various stop posts 324 along the path $P_1$. The stop posts 324 can be mounted with an equi-angular spacing to provide equal rotary increments or with unequal spacing to provide unequal rotary increments. In addition, the stroke length of the rack 334 relative to the angular increment desired can be such that more than one stroke of the rack 334 can be used to effect the desired rotary incrementing of the shaft 312.

Figure 11:
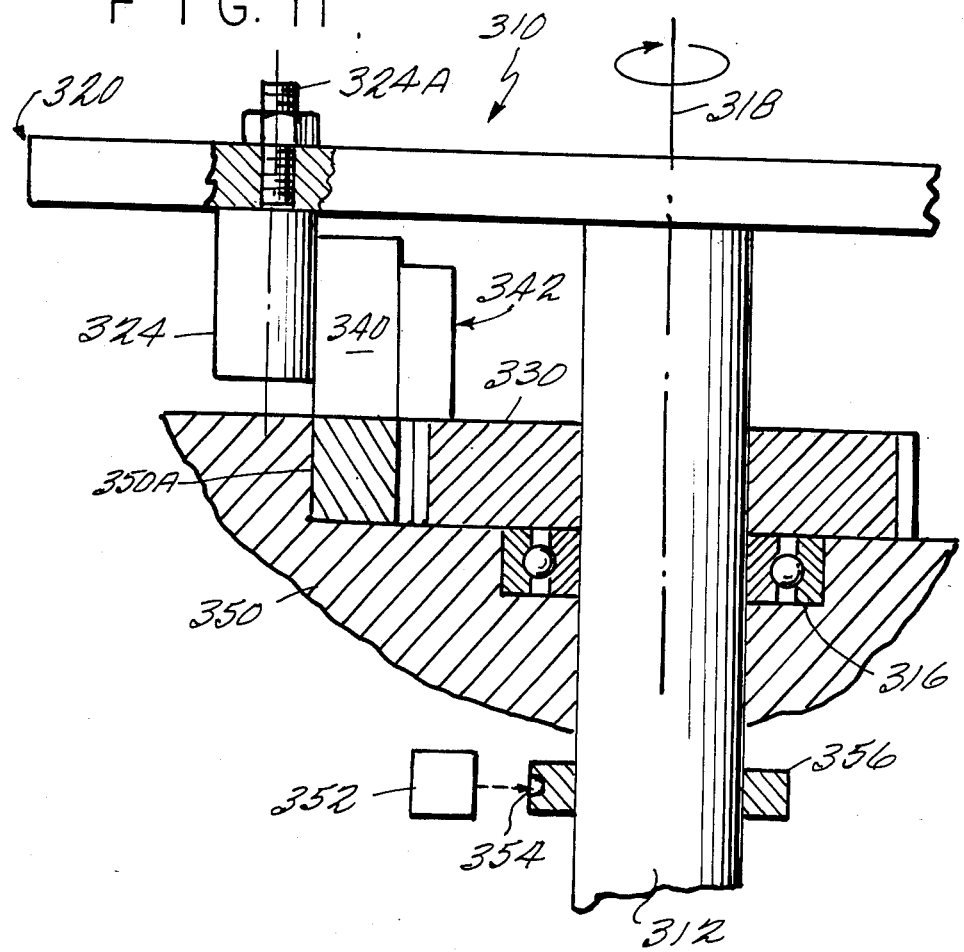
FIG. 11 is a side view, in partial cross section, of another embodiment of the present invention, illustrating the manner in which the principal components of the rotary indexing mechanism are mounted on a support plate.
Figure 11A:
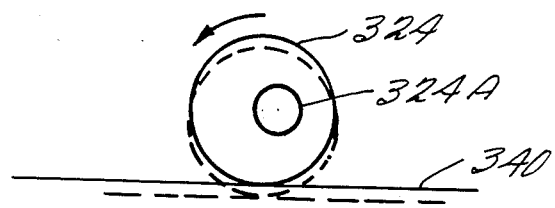
FIG. 11A is a schematic representation of an eccentrically mounted stop post illustrated in FIGS. 9 and 11.

The end-of-movement position for each rotary increment is determined by the dimensional relationship of the stop posts 324 and the stop plate 340. The end-of-movement position can be varied, for example, by providing stop posts 324 with different diameters, cross-sectional areas, or, as shown in the embodiment of FIG. 11, providing each stop post 324 with a reduced diameter threaded stud 324A that is positioned eccentrically relative to the axis 326 of the stop post 324. Thus, as shown in FIG. 11A, the dimensional relationship of the stop posts 324 relative to the stop plate 340 can be readily adjusted to adjust, with precision, the end-of-movement position of the shaft 312 and sprocket 320. As shown in FIG. 11, the shaft 312 is carried in a support plate 350 that also carries the bearings 314 and 316 with the rack 334 located between the pinion 330 and a shoulder 350A. In the embodiment of FIG. 11, the shaft 312 is incrementally rotatable in the opposite direction of that illustrated in FIG. 9.

During the operating stroke, the actuator 336 is preferably driven for a fixed time period of sufficient duration to insure that the rack 334 is driven to its advanced position. If desired, various switches, such as switch 352 (FIG. 11) co-acting with one or more detents 354 on a shaft-mounted collar 356 can be used to determine when the rack 334 is in its retracted or advanced positions. The actuator 336 is preferably of the hydraulic or pneumatic type, since the operating pressure and force applied can be readily controlled by controlling the fluid pressure supplied to the actuator 336. Since the actuator 336 is periodically stalled by the operation of the engaged stop posts 324 and stop plate 340, the actuator 336 operating force is desirably limited to some upper limit necessary to effect operation. In a typical operating cycle, the actuator 336 is pressurized with an operating fluid to drive the rack 334 to the right in FIG. 9. The actuator 336 is pressurized for a predetermined time period, for example, 0.5 seconds, this time period having been empirically determined to be longer than the actual time required to effect the desired rotary increment. When the switch 352 is actuated by the presence of the detent 354, the output of the switch 352 functions to certify that the operating stroke has indeed proceeded to completion. If, for some reason, the rotary incrementing is not completed, the machine will be stopped at the end of the predetermined time period. As can be appreciated, each pallet 60 is thus transported in successive step-wise movements of equal length from pallet position $P(p)_n$ to pallet position $P(p)_{n+1}$ to be operated upon by the various tooling modules, discussed below, present at the various work station positions $P(m)_n$.

The configuration and structure of the tooling modules depends upon the nature of the specific application to be performed. For example, where the installation of a machine component, such as a bearing, into a bearing receiving bore of a machined housing or casting is required, a tooling module of the type described in applicant's copending U.S. patent application Ser. No. 06/881,234 filed, July 2, 1986 and entitled "Machine Component Installation Device" (the disclosure of which is incorporated herein by reference) may be used at a work station position $P(m)_n$. Other forms of work stations including the vertical tapping station 100 of FIGS. 7 and 7A and the wash station 200 of FIGS. 8 and 8A may likewise be used.

Figure 7A:
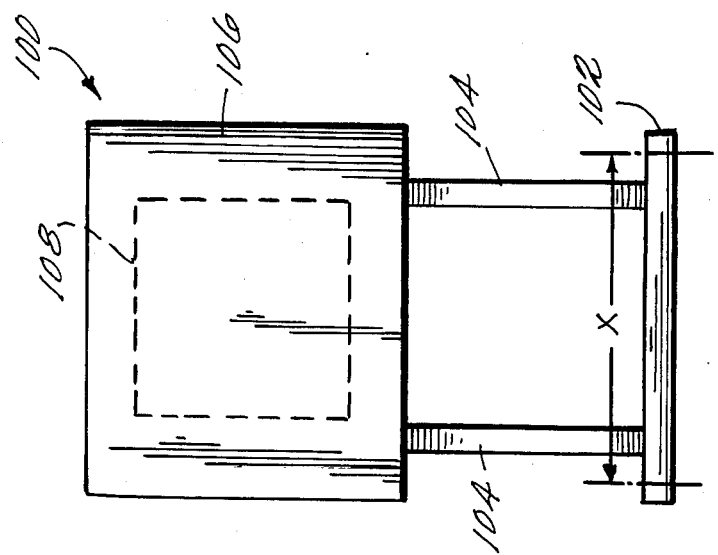
FIG. 7A is a front elevation view of the tooling module of FIG. 7.
Figure 7:
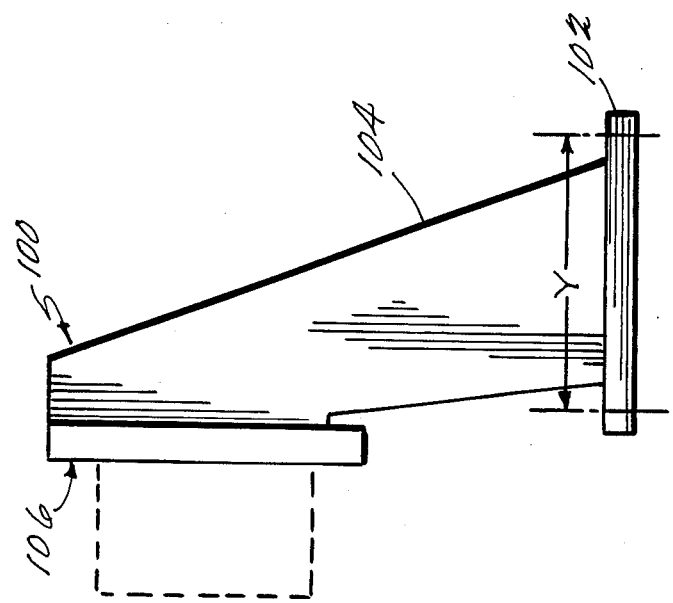
FIG. 7 is elevational view of an exemplary tooling module.

As shown in FIGS. 7 and 7A, the vertical tapping station 100 includes a module mounting plate 102 having length and width dimensions consistent with that established for the machine system and the X-Y dimensioning scheme to allow the mounting plate 102 to be bolted to any of the work station positions $P(m)_n$. A pair of inclined columns 104 extend upwardly from the mounting plate 102 and terminate at their upper end with a base plate 106 aligned in the vertical direction. A thread tapping station 108 (schematically represented) is mounted on the base plate 106 for reciprocating motion in the vertical direction between an upper position and a lower position in which the tap cuts threads in an appropriately sized and aligned bore in the work piece WP carried on the pallet 60. The tapping station is preferably of the type disclosed in copending U.S. patent application Ser. No. 839,565, filed Mar. 14, 1986 by John L. Wickham and Ross C. Miller and entitled "Thread Tapping Machine Tool," the disclosure of which is incorporated herein by reference.

Figure 8:
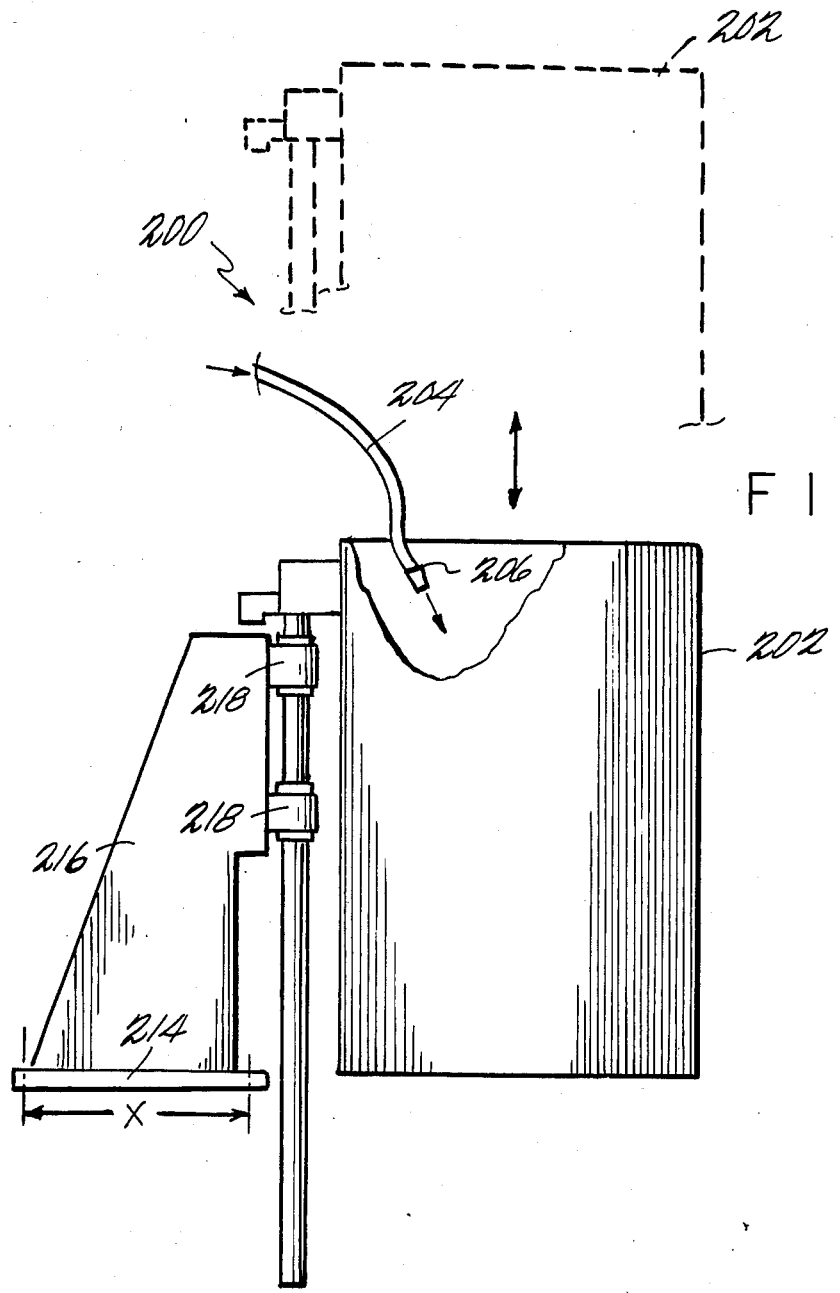
FIG. 8 is a side elevational view of a wash station tooling module.

An exemplary wash station tooling module 200 is shown in FIGS. 8 and 8A and includes a hood 202 designed for vertical movement between and upper position (dotted line illustration) in which the hood 202 is sufficiently raised to allow the work piece and its supporting pallet (not specifically shown) to pass beneath the lower edge of the hood 202 and a lowered position in which the hood 202 Completely surrounds the work piece and pallet 60. A pressurized wash fluid line 204, typically carrying a detergent based wash fluid, is connected to the hood 202 and terminates with a plurality of articulatable nozzles, represented by the nozzle 206, that can be manually aimed at selected portions of the work piece to be washed. The hood 202 includes, on its rear surface (FIG. 8A), a bracket 208 to which a pair of spaced parallel guide bars 210 are secured at their upper ends. A sub-bracket 212 extends rearwardly from the bracket 208 and is used, as explained below, to lift the hood 202 to its raised position. A base plate 214, having mounting bores in accordance with the X-Y standard dimensioning scheme described above, includes first and second columns 216 that carry sleeve bearings 218 into which the guide bars 210 are journalled. A fluid actuator 210 is connected to the base plate 214 and includes a ram 222 that engages the sub-bracket 212 to allow lifting of the hood 202 as the ram 222 is extended upwardly. The upper end of the ram 222 not secured or otherwise coupled to the sub-bracket 212. If, upon lowering of the hood 202, the lower edge of the hood 202 should engage and be held in a raised position by a mislocated work piece, the ram 222 will disengage from the sub-bracket 212 to prevent a forcible lowering of the hood 202.

Thus it will be appreciated from the above that as a result of the present invention, a highly effective integrated process machine system is provided by which the principal objective, among others, is completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims.

What is claimed is:

1. An integrated process machine system comprising:
means defining a platform having a plurality of tool module accepting positions, each of said tool module accepting positions having a common dimension mounting interface for accepting any one of a plurality of tool modules; and
a work piece transport system for moving a work piece from one tool module accepting position to another, said transport system including a carrier band entrained about said first and second sprockets, at least one work piece carrying pallet, means for connecting said at least one pallet to said carrier band, a rotary indexing mechanism for incrementing said carrier band in a step-wise manner to carry said pallet from one tool module accepting position to another with each incrementing of said carrier band, said rotary indexing mechanism including:
a rotatably mounted shaft carrying a first member that moves along a first path in response to rotation of said shaft;
a one-way clutch coupled to said shaft, said clutch drivable in a first direction to couple rotation to said shaft and in an opposite direction in which said shaft is uncoupled;
means for driving said clutch in the first the opposite directions to cause incremental rotation of said shaft when driven in the first direction; and
a second member connected to said driving means and reciprocal along a second path in response to driving of said clutch in the first and opposite directions, said first and second paths intersecting;
the first and second members engaging one another to stop rotation of said shaft at a predetermined rotary position.

2. An integrated process machine system comprising:
means defining a platform having a plurality of tool module accepting positions, each of said tool module accepting positions having a common dimension mounting interface for accepting any one of a plurality of tool modules; and
a work piece transport system for moving a work piece from one tool module accepting position to another, said transport system including a carrier band entrained about first and second sprockets, at least one work piece carrying pallet, means for connecting said at least one pallet to said carrier band, a rotary indexing mechanism for incrementing said carrier band in a step-wise manner to carry said pallet from one tool module accepting position to another with each incrementing of said carrier band, said rotary indexing mechanism including:
a rotatably mounted shaft carrying a first member that revolves about the shaft along an orbital path in response to rotation of said shaft;
a one-way clutch coupled to said shaft, said clutch drivable in a first direction to couple rotation to said shaft and in an opposite direction in which said shaft is uncoupled;
linearly reciprocating means coupled to said clutch for driving said clutch in the first and opposite directions to cause incremental rotation of said shaft when driven in the first direction; and
a second member connected to said reciprocating means and reciprocable along a second path in response to driving of said clutch in the first and opposite directions, said oribital and second paths intersecting;
the first and second members engaging one another as said clutch is driven in the first direction to stop rotation of said shaft at a predetermined rotary position.

3. An integrated process machine system comprising:
means defining a platform having a plurality tool module accepting positions, each of said tool module accepting positions having a common dimension mounting interface for accepting any one of a plurality of tool modules; and a work piece transport system for moving a work piece from one tool module accepting position to another, said transport system including a carrier band entrained about first and second sprockets, at least one work piece carrying pallet, means for connecting said at least one pallet to said carrier band, a rotary indexing mechanism for incrementing said carrier band in a step-wise manner to carry said pallet from one tool module accepting position to another with each incrementing of said carrier band, said rotary indexing mechanism including:

a rotatably mounted shaft carrying an enlarged diameter disc member having at least one stop member that revolves about the shaft along a circumferential path in response to rotation of said shaft;

a one-way clutch coupled to said shaft, said clutch drivable in a first direction to couple rotation to said shaft and in an opposite direction in which said shaft is uncoupled;

a pinion gear coupled to said clutch and driven by a reciprocal rack to drive said clutch in the first and opposite directions to cause incremental rotation of said shaft when driven in the first direction; and a second member connected to said rack and reciprocal along a second path in response to driving of said clutch in the circumferential and opposite directions, said circumferential and second paths intersecting;

the first and second members engaging one another as said clutch is driven in the first direction to stop rotation of said shaft at a predetermined rotary position.

4. An integrated process machine system as in claim 3, further comprising a bi-directional actuator means for driving said rack in the first and opposite directions.

5. An integrated process machine system comprising:
means defining a platform having a plurality of tool module accepting positions, each of said tool module accepting positions having a common dimension mounting interface for accepting any one of a plurality of tool modules; and a work piece transport system for moving a work piece from one tool module accepting position to another, said transport system including a carrier band entrained about first and second sprockets, at least one work piece carrying pallet, means for connecting said at least one pallet to said carrier band, a rotary indexing mechanism for incrementing said carrier band in a step-wise manner to carry said pallet from one tool module accepting position to another with each incrementing of said carrier band, said rotary indexing mechanism including:

a first member mounted for rotation about an axis and carrying at least one first stop member for a movement along an orbital path about the axis as said first member rotates; and means for periodically rotating said first member in a first direction about said axis and for moving a second stop member along a linear path that intersects said orbital path to periodically cause said first and second stop members to engage and halt further rotation of said first member, wherein said first member is a disc mounted on a shaft for incremented rotation therewith and said shaft has a one-way clutch mechanism associated therewith, said one way clutch having inner and outer elements, said inner element being mounted on said shaft for rotation therewith.

6. An integrated process machine system as in claim 5, wherein said outer element of said one-way clutch is driven in first and opposite rotational direction by said means for periodically rotating.

7. An integrated process machine system as in claim 6, wherein said one-way clutch drives said shaft when said outer element is driven in said first direction and disengages said shaft when driven in said opposite direction.

8. An integrated process machine system as in claim 5, wherein said means for periodically rotating is a reciprocal rack.

9. An integrated process machine system as in claim 8, wherein said reciprocal rack has an end portion, defining said second stop member, which extends beyond said outer element of said one-way clutch, and which intersects the orbital path of said first stop member, thereby halting further movement of said first stop member, said disc, and said shaft.

* * * * *